United States Patent
Wood

(10) Patent No.: US 12,368,299 B2
(45) Date of Patent: Jul. 22, 2025

(54) VEHICLE BATTERY JUMP STARTER WITH MULTIPLE BATTERY PACK COMPATIBILITY

(71) Applicant: MILWAUKEE ELECTRIC TOOL CORPORATION, Brookfield, WI (US)

(72) Inventor: Steven J. Wood, Shorewood, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 605 days.

(21) Appl. No.: 17/809,460

(22) Filed: Jun. 28, 2022

(65) Prior Publication Data
US 2022/0399741 A1    Dec. 15, 2022

Related U.S. Application Data

(63) Continuation of application No. 17/604,268, filed as application No. PCT/US2021/031050 on May 6, 2021, now Pat. No. 11,374,429.

(Continued)

(51) Int. Cl.
*H02J 1/10*     (2006.01)
*F02N 11/12*    (2006.01)
(Continued)

(52) U.S. Cl.
CPC .............. *H02J 1/122* (2020.01); *F02N 11/12* (2013.01); *H02J 7/0047* (2013.01); *H02J 7/342* (2020.01);
(Continued)

(58) Field of Classification Search
CPC .......... H02J 7/342; H02J 7/345; H02J 7/0013; H02J 7/0047; H02J 1/122; F02N 11/12; F02N 11/14
(Continued)

(56) References Cited

U.S. PATENT DOCUMENTS 7,180,200 B2    2/2007    Walter et al.
7,309,928 B2    12/2007   Grant et al.
(Continued)

FOREIGN PATENT DOCUMENTS

CN    107800180 A    3/2018
EP    3211755 A1    8/2017
(Continued)

OTHER PUBLICATIONS

Extended European Search Report for Application No. 21799514.1 dated Aug. 9, 2024 (9 pages).

(Continued)

*Primary Examiner* — Edward Tso
*Assistant Examiner* — Aaron Piggush
(74) *Attorney, Agent, or Firm* — Michael Best & Friedrich LLP

(57) ABSTRACT

A vehicle battery jump starter including a battery pack interface configured to receive at least one of a first rechargeable battery pack having a first nominal voltage and a second rechargeable battery pack having a second nominal voltage different from the first nominal voltage, a power boost module including one or more energy storage devices, and terminal clamps configured to electrically connect the vehicle battery jump starter to a vehicle battery. The jump starter further includes a controller having an electronic processor configured to close a jump start switch in response to detecting an attempted vehicle start, close a first bypass switch when the voltage of the battery pack is greater than the voltage threshold, and close the second bypass switch when the voltage of the battery pack is less than the voltage threshold.

20 Claims, 12 Drawing Sheets

Related U.S. Application Data

(60) Provisional application No. 63/021,185, filed on May 7, 2020.

(51) Int. Cl.
  *H02J 7/00*  (2006.01)
  *H02J 7/34*  (2006.01)
  *F02N 11/14*  (2006.01)

(52) U.S. Cl.
  CPC ............... *H02J 7/345* (2013.01); *F02N 11/14* (2013.01); *H02J 7/0013* (2013.01)

(58) Field of Classification Search
  USPC ........ 320/104, 105, 107, 109, 122, 134, 136
  See application file for complete search history.

(56) References Cited

U.S. PATENT DOCUMENTS

| | | | |
|---|---|---|---|
| 7,687,926 B2 | 3/2010 | Grant et al. | |
| 7,989,969 B2 | 8/2011 | Grant et al. | |
| 8,319,357 B2 | 11/2012 | Usselman et al. | |
| 8,759,991 B2 | 6/2014 | Grant et al. | |
| 9,007,015 B1 | 4/2015 | Nook et al. | |
| 9,276,438 B2 | 3/2016 | Grant et al. | |
| 9,653,933 B2 | 5/2017 | Inskeep | |
| 9,673,652 B2 | 6/2017 | Inskeep | |
| 9,768,435 B2 | 9/2017 | Koebler et al. | |
| 9,770,992 B2 | 9/2017 | Nook et al. | |
| 9,819,204 B2 | 11/2017 | Miller et al. | |
| 9,954,207 B2 | 4/2018 | Koebler | |
| 10,174,736 B2* | 1/2019 | Zhang ..................... | H02J 7/345 |
| 10,801,460 B2 | 10/2020 | Butler et al. | |
| 2004/0251876 A1 | 12/2004 | Bertness | |
| 2005/0162124 A1* | 7/2005 | Bertness .................. | H02J 7/342 |
| | | | 320/105 |
| 2008/0265844 A1 | 10/2008 | Smith et al. | |
| 2012/0091944 A1 | 4/2012 | Rogers | |
| 2014/0139175 A1 | 5/2014 | Gonzalez | |
| 2014/0266000 A1 | 9/2014 | Meoli | |
| 2015/0130400 A1 | 5/2015 | Inskeep | |
| 2016/0072323 A1 | 3/2016 | Miller et al. | |
| 2017/0012448 A1 | 1/2017 | Miller et al. | |
| 2017/0110766 A1 | 4/2017 | Koebler | |
| 2017/0163066 A1 | 6/2017 | Inskeep et al. | |
| 2017/0226980 A1 | 8/2017 | Butler et al. | |
| 2017/0288435 A1 | 10/2017 | Miller et al. | |
| 2017/0310153 A1* | 10/2017 | Inskeep ................... | H02J 7/342 |
| 2017/0317492 A1 | 11/2017 | Koebler | |
| 2017/0335817 A1 | 11/2017 | De Lise et al. | |
| 2017/0346140 A1 | 11/2017 | Koebler | |
| 2018/0048168 A1 | 2/2018 | Miller et al. | |
| 2018/0111491 A1 | 4/2018 | Nook et al. | |
| 2018/0191185 A1 | 7/2018 | Al Rasheed | |
| 2018/0215274 A1 | 8/2018 | Nook et al. | |
| 2018/0233934 A1 | 8/2018 | Miller et al. | |
| 2019/0237976 A1 | 8/2019 | Lau | |
| 2020/0067333 A1* | 2/2020 | Wekwert ................. | H02J 1/122 |
| 2020/0295575 A1* | 9/2020 | Nook ....................... | F02N 11/12 |
| 2021/0021139 A1 | 1/2021 | Windsor | |

FOREIGN PATENT DOCUMENTS

| | | |
|---|---|---|
| WO | 2014166351 A1 | 10/2014 |
| WO | 2018098441 A1 | 5/2018 |
| WO | 2020030914 A1 | 2/2020 |

OTHER PUBLICATIONS

NOCO GB70 Genius BoostHD Jump Starter brochure, available at least as early as Jul. 13, 2018 (2 pages).
NOCO GB40 Genius Boost+ Jump Starter brochure, available at least as early as Jul. 13, 2018 (2 pages).
Rezervo RZ-300 Batteryless Jump Starter brochure, available at least as early as Jul. 13, 2018 (2 pages).
International Search Report and Written Opinion for Application No. PCT/US2021/031050 dated Aug. 27, 2021 (9 pages).

* cited by examiner

VEHICLE BATTERY JUMP STARTER WITH MULTIPLE BATTERY PACK COMPATIBILITY

RELATED APPLICATIONS

This application is a continuation of U.S. patent application Ser. No. 17/604,268, filed Oct. 15, 2021, now U.S. Pat. No. 11,374,429, which is a national stage entry under 35 U.S.C. § 371 of PCT Patent Application No. PCT/US2021/031050, filed May 6, 2021, which claims the benefit of U.S. Provisional Patent Application No. 63/021,185, filed May 7, 2020, the entire content of each of which is hereby incorporated by reference.

FIELD

Embodiments described herein relate to a vehicle battery jump starter powered by a removable and rechargeable battery pack.

SUMMARY

Vehicle battery jump starters are subject to a number of design limitations that make the implementation of a vehicle battery jump starter difficult. For example, the vehicle battery jump starter must satisfy requirements related to voltage magnitudes (e.g., vehicle battery overvoltage), power source undervoltage (e.g., jump starter power source undervoltage), sparking and short circuiting, and electrical current magnitude. As a result of these limitations, current vehicle battery jump starters are dedicated devices with internal power sources that can be charged and then used as necessary to jump start a vehicle. These jump starters may include a sealed lead acid battery, a plurality of lithium polymer battery cells, or a bank of supercapacitors. Such devices are often charged from AC mains power. However, because AC mains power is not always readily available, it is possible that, in an emergency, the vehicle battery jump starters may lack sufficient charge to jump start a vehicle battery. In some embodiments, a depleted vehicle battery can be used to slowly charge a bank of supercapacitors, but the bank of supercapacitors alone may not always be sufficient to jump start the vehicle battery.

As an alternative to conventional vehicle battery jump starters, a vehicle battery jump starter that could be powered by a battery pack for cordless, hand-held power tools would greatly enhance the versatility of vehicle battery jump starters. Such a jump starter could be used anywhere at any time as long as a battery pack is available. Power tool battery backs vary in voltage, capacity, physical size, etc. As such, it would be advantageous for a vehicle battery jump starter to be compatible with multiple types of power tool battery packs.

One of the difficulties in implementing a vehicle battery jump starter powered by a battery pack for power tools is the magnitude of current that the battery pack is capable of producing. Electrical current limitations of battery packs in the context of vehicle battery jump starters can be mitigated or removed if the battery pack is first used to charge an energy storage device or devices (e.g., a bank of supercapacitors, lithium polymer battery cells, etc.). After the supercapacitors or lithium polymer battery cells are discharged, current can also be discharged from battery pack. The battery pack discharge current in combination with discharge current from the supercapacitors or lithium polymer battery cells can be sufficient to jump start a vehicle battery.

In some embodiments, just as a depleted vehicle battery can be used to charge a bank of supercapacitors, a depleted battery pack could be used alone or in conjunction with a depleted vehicle battery to charge the bank of supercapacitors. The bank of supercapacitors could then be used to attempt to jump start the vehicle battery.

Embodiments described herein provide a vehicle battery jump starter. The vehicle battery jump starter includes a battery pack interface configured to receive at least one of a first rechargeable battery pack having a first nominal voltage and a second rechargeable battery pack having a second nominal voltage different from the first nominal voltage, a power boost module including one or more energy storage devices, and first and second terminal clamps configured to electrically connect the vehicle battery jump starter to a vehicle battery. The vehicle battery jump starter further includes a first bypass switch provided on a first current path from the battery pack interface to the vehicle battery, and a second bypass switch provided on a second current path from the battery pack interface to the vehicle battery. The vehicle battery jump starter further includes a controller having an electronic processor configured to determine whether a voltage of a battery pack attached to the battery pack interface is greater than a voltage threshold, close the first bypass switch when the voltage of the battery pack is greater than the voltage threshold to discharge current from the battery pack and the power boost module to the vehicle battery, and close the second bypass switch when the voltage of the battery pack is less than the voltage threshold to discharge current from the battery pack and the power boost module to the vehicle battery.

Embodiments described herein provide a vehicle battery jump starter system. The vehicle battery jump starter system includes at least one of a first rechargeable battery pack having a first nominal voltage and a second rechargeable battery pack having a second nominal voltage different from the first nominal voltage and a vehicle battery jump starter. The vehicle battery jump starter includes a battery pack interface configured to receive one of the first rechargeable battery pack and the second rechargeable battery pack, a power boost module including one or more energy storage devices, and first and second terminal clamps configured to electrically connect the vehicle battery jump starter to a vehicle battery. The vehicle battery jump starter further includes a first bypass switch provided on a first current path from the battery pack interface to the vehicle battery, and a second bypass switch provided on a second current path from the battery pack interface to the vehicle battery. The vehicle battery jump starter further includes a controller having an electronic processor configured to determine whether a voltage of a battery pack attached to the battery pack interface is greater than a voltage threshold, close the first bypass switch when the voltage of the battery pack is greater than the voltage threshold to discharge current from the battery pack and the power boost module to the vehicle battery, and close the second bypass switch when the voltage of the battery pack is less than the voltage threshold to discharge current from the battery pack and the power boost module to the vehicle battery.

Embodiments described herein provide a method of jump starting a battery of a vehicle. The method includes attaching a removable and rechargeable battery pack to a vehicle battery jump starter, the vehicle battery jump starter including a power boost module including one or more energy storage devices and a controller including an electronic processor, and electrically connecting the vehicle battery jump starter to a vehicle battery. The method further includes determining, by the controller, whether a voltage of the battery pack is greater than a voltage threshold, closing a first bypass switch in a first current path from the battery pack to the vehicle battery when the voltage of the battery pack is greater than the voltage threshold to discharge current from the battery pack and the power boost module to the vehicle battery, and closing a second bypass switch provided in a second current path from the battery pack to the vehicle battery when the voltage of the battery pack is less than the voltage threshold to discharge current from the battery pack and the power boost module to the vehicle battery.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to a vehicle battery jump starter that is powered by a removable and rechargeable battery pack, such as a battery pack used with various hand-held power tools. The battery pack removably connects to a vehicle battery jump starter. The battery pack, or a plurality of battery packs connected together, can be used to power the vehicle battery jump starter and jump start a vehicle battery. The battery pack can also be selectively used to charge a power boost module within the vehicle battery jump starter. The power boost module includes, for example, an energy storage device or devices, such as a plurality of supercapacitors or lithium polymer battery cells. The power boost module in combination with the removable and rechargeable battery pack can be used to jump start the vehicle battery.

Figure 1:
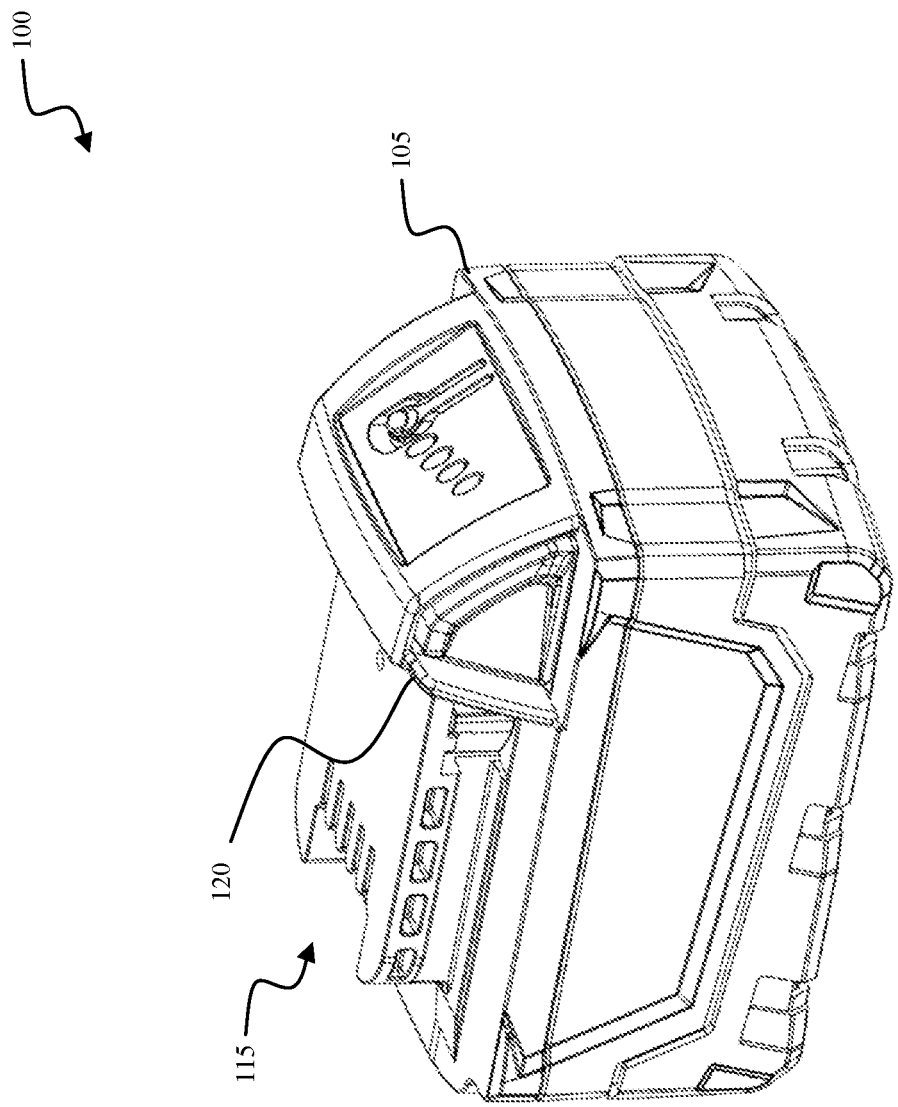
FIG. 1 is a perspective view of a battery pack, according to embodiments described herein.
Figure 2:
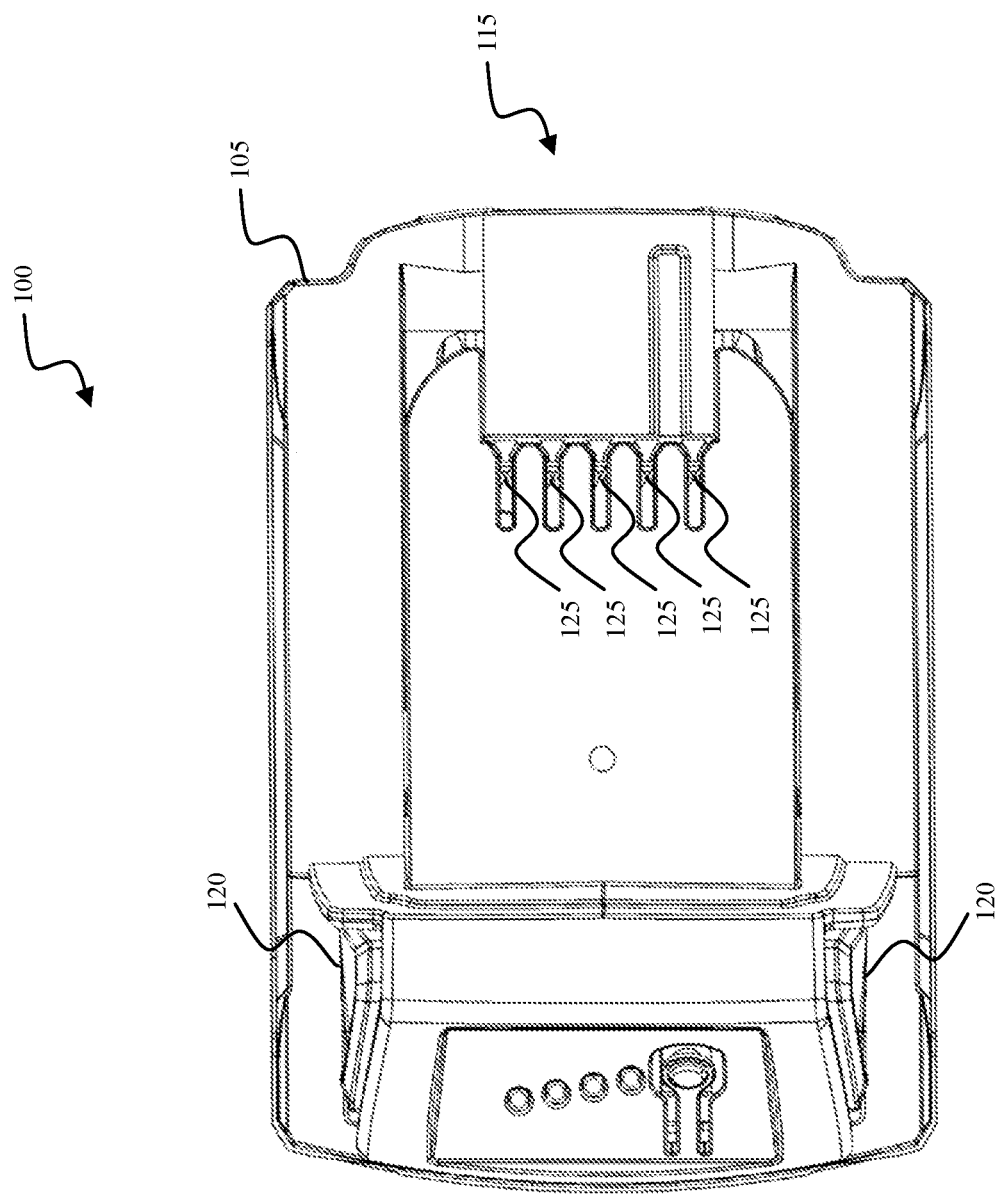
FIG. 2 is a top view of the battery pack of FIG. 1.
Figure 3A:
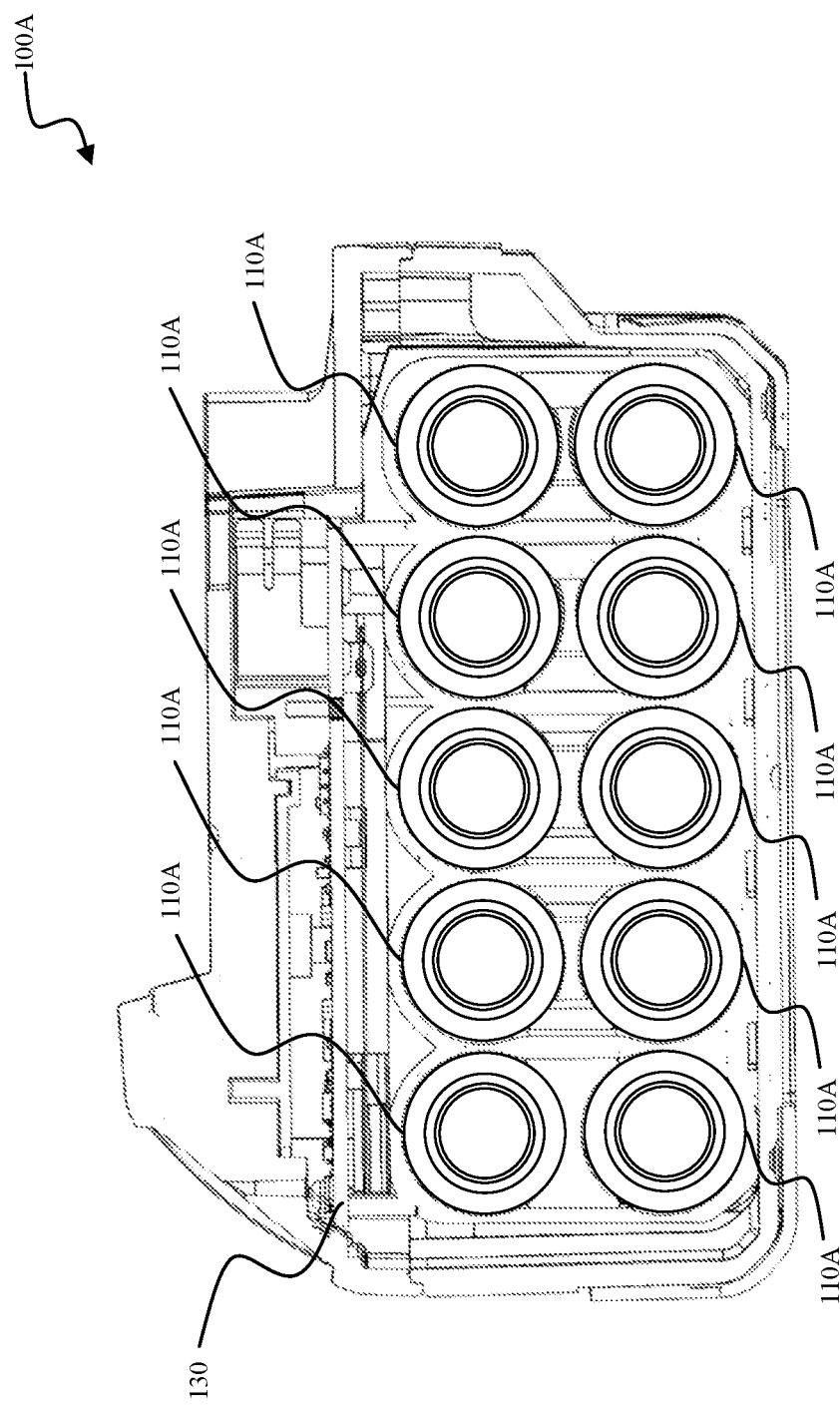
FIG. 3A is a section view of the battery pack of FIG. 1 showing battery cells, according to embodiments described herein.
Figure 3B:
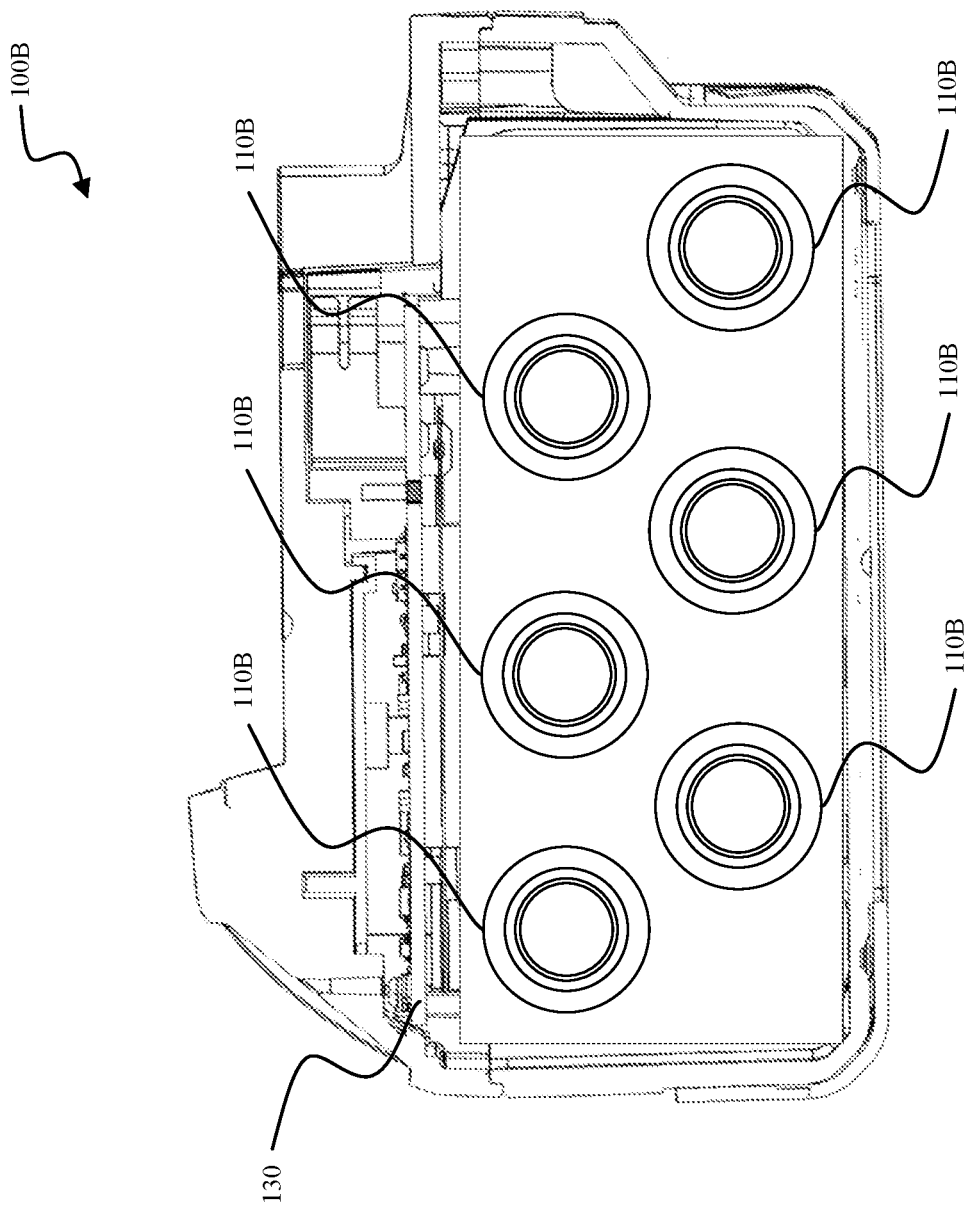
FIG. 3B is a section view of a second embodiment of the battery pack of FIG. 1 showing battery cells.

FIGS. 1-3 illustrate a battery pack 100 for use with a vehicle battery jump starter. The battery pack 100 is connectable to and supportable by hand-held power tools such as drills, fasteners, saws, pipe cutters, sanders, nailers, staplers, vacuum cleaners, etc. The battery pack 100 is also connectable to and supportable by outdoor power tools such as string trimmers, hedge trimmers, blowers, chain saws, etc. As shown in FIGS. 1-3, the battery pack 100 includes a housing 105 and at least one rechargeable battery cell 110 (shown in FIGS. 3A and 3B) supported by the housing 105. The battery pack 100 also includes a support portion 115 for supporting the battery pack 100 on a tool, and a coupling mechanism 120 for selectively coupling the battery pack 100 to, or releasing the battery pack 100 from, the tool. The support portion 115 is connectable to a complementary support portion on the tool.

The battery pack 100 includes a plurality of terminals 125 located within the support portion 115 and operable to electrically connect the battery cells 110 to a PCB 130 within the battery pack 100. The plurality of terminals 125 includes, for example, a positive battery terminal, a ground terminal, and a sense or data terminal. The battery pack 100 is removably and interchangeably connected to a tool to provide operational power to the tool. The terminals 125 are configured to mate with corresponding power terminals extending from a tool within a complementary receiving portion or the tool.

The battery cells 110 are lithium-based battery cells having a chemistry of, for example, lithium-cobalt ("Li—Co"), lithium-manganese ("Li—Mn"), or Li—Mn spinel. In some embodiments, the battery cells 110 have other suitable lithium or lithium-based chemistries, such as a lithium-based chemistry that includes manganese, etc. The battery cells 110 within the battery pack 100 provide operational power (e.g., voltage and current) to the tools. The battery cells 110 may have different nominal voltages, such as, for example, between 3.6V and 4.2V. Likewise, the battery pack 100 may have different nominal voltages, such as, for example, 10.8V, 12V, 14.4V, 21V, 24V, 28V, 36V, 60V, 80V, between 10.8V and 80V, etc. The battery cells 110 also each have a capacity of, for example, approximately between 1.0 ampere-hours ("Ah") and 6.0 Ah. In exemplary embodiments, the battery cells 110 each have capacities of approximately, 1.5 Ah, 2.4 Ah, 3.0 Ah, 4.0 Ah, 6.0 Ah, between 1.5 Ah and 6.0 Ah, etc. In some embodiments, a battery pack 100 having a total battery pack capacity of approximately 5.0 Ah or greater (e.g., 5.0 Ah to 12.0 Ah) is used in combination with a vehicle battery jump starter. In other embodiments, a battery pack 100 having a total battery pack capacity of approximately 1.5 Ah or greater (e.g., 1.5 Ah to 12.0 Ah) is used in combination with a vehicle battery jump starter.

For example, FIG. 3A illustrates an embodiment of a first battery pack 100A that includes ten battery cells 110A. The battery cells 110A are configured in a series-parallel arrangement of five sets of two series-connected cells. If it is assumed that each battery cell 110A has a nominal voltage of approximately 3.6V, the battery pack 100A has a nominal voltage of approximately 18V. In some embodiments, the first battery pack 100A includes only five series-connected battery cells 110A.

In other embodiments, the battery pack 100 includes a different number of battery cells (e.g., between three and thirty battery cells) connected in series, parallel, or a series-parallel combination in order to produce a battery pack having a desired combination of nominal battery pack voltage and battery capacity. For example, FIG. 3B illustrates an embodiment of a second battery pack 100B that includes six battery cells 110B. The battery cells 110B are configured in a series-parallel arrangement of three sets of two series-connected cells. If it is assumed that each battery cell 110B has a nominal voltage of approximately 4.0V, the battery pack 100B has a nominal voltage of approximately 12V. In some embodiments, the second battery pack 100B includes only three series-connected battery cells 110B.

Figure 4:
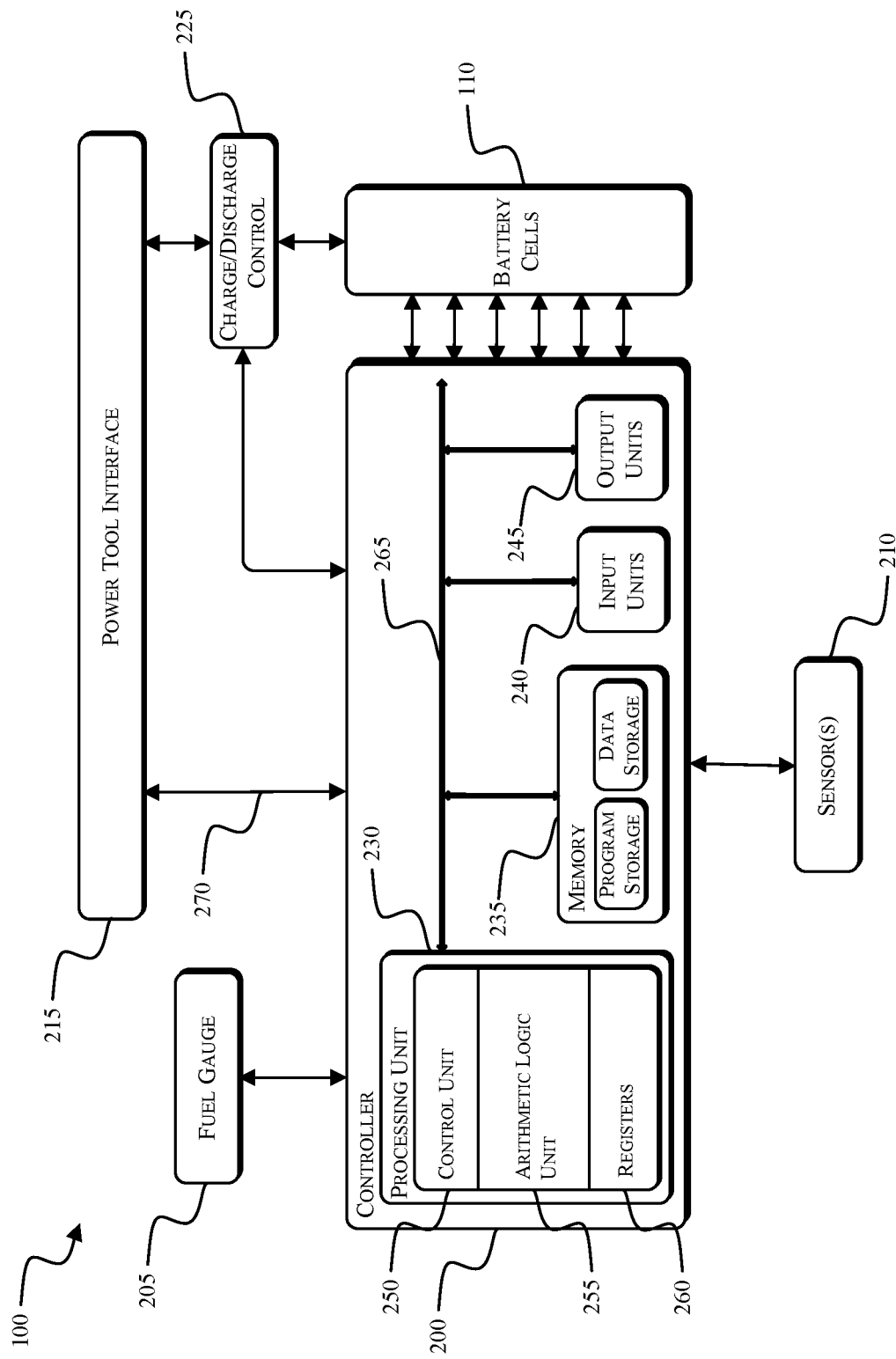
FIG. 4 is an electromechanical diagram of the battery pack of FIGS. 1-3, according to embodiments described herein.

The power output by the battery pack 100 to a tool is controlled, monitored, and regulated using control electronics within the battery pack 100, a tool, or a combination thereof. FIG. 4 illustrates a controller 200 associated with the battery pack 100. The controller 200 is electrically and/or communicatively connected to a variety of modules or components of the battery pack 100. For example, the illustrated controller 200 is connected to a plurality of battery cells 110, a fuel gauge 205, one or more sensors 210, a tool interface 215, and a charge/discharge control module 220 (optional within battery pack). The controller 200 includes combinations of hardware and software that are operable to, among other things, control the operation of the battery pack 100, activate the fuel gauge 205, monitor the operation of the battery pack 100, etc. The fuel gauge 205 includes, for example, one or more indicators, such as light-emitting diodes ("LEDs"). The fuel gauge 205 can be configured to display conditions of, or information associated with, the state-of-charge of the battery cells 110. The controller 200 also includes a variety of preset or calculated fault condition values related to temperatures, currents, voltages, etc., associated with the operation of a tool or the battery pack 100.

In some embodiments, the controller 200 includes a plurality of electrical and electronic components that provide power, operational control, and protection to the components and modules within the controller 200 and/or battery pack 100. For example, the controller 200 includes, among other things, a processing unit 230 (e.g., a microprocessor, a microcontroller, an electronic controller, and electronic processor, or another suitable programmable device), a memory 235, input units 240, and output units 245. The processing unit 230 includes, among other things, a control unit 250, an arithmetic logic unit ("ALU") 255, and a plurality of registers 260 (shown as a group of registers in FIG. 4), and is implemented using a known computer architecture (e.g., a modified Harvard architecture, a von Neumann architecture, etc.). The processing unit 230, the memory 235, the input units 240, and the output units 245, as well as the various modules connected to the controller 200 are connected by one or more control and/or data buses (e.g., common bus 265). The control and/or data buses are shown generally in FIG. 4 for illustrative purposes. The use of one or more control and/or data buses for the interconnection between and communication among the various modules and components would be known to a person skilled in the art in view of the embodiments described herein. In some embodiments, the controller 200 is implemented partially or entirely on a semiconductor (e.g., a field-programmable gate array ["FPGA"] semiconductor) chip, such as a chip developed through a register transfer level ("RTL") design process.

The memory 235 is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 235 and executes software instructions that are capable of being stored in a RAM of the memory 235 (e.g., during execution), a ROM of the memory 235 (e.g., on a generally permanent basis), or another non-transitory computer readable medium such as another memory or a disc. Software included in the implementation of the battery pack 100 can be stored in the memory 235 of the controller 200. The software includes, for example, firmware, one or more applications, program data, filters, rules, one or more program modules, and other executable instructions. The controller 200 is configured to retrieve from memory and execute, among other things, instructions related to the control of the battery pack described herein. The controller 200 can also store various battery pack parameters and characteristics (including battery pack nominal voltage, chemistry, battery cell characteristics, maximum allowed discharge current, maximum allowed temperature, etc.). In other constructions, the controller 200 includes additional, fewer, or different components.

The tool interface 215 includes a combination of mechanical components (e.g., the support portion 115) and electrical components (e.g., the plurality of terminals 125) configured to, and operable for, interfacing (e.g., mechanically, electrically, and communicatively connecting) the battery pack 100 with a tool or another device. For example, power provided from the battery pack 100 to a tool or device is provided through the charge/discharge control module 220 to the tool interface 215. The charge/discharge control module 220 includes, for example, one or more switches (e.g., FETs) for controlling the charging current to and discharge current from the battery cells 110. In some embodiments, power provided from the battery pack 100 to a tool or device (or from a charger) is controlled by a charge/discharge control module 225 that is external to the battery pack 100 (i.e., internal to a tool, device, or charger). The tool interface 215 also includes, for example, a communication line 270 for providing a communication line or link between the controller 200 and a tool or device (e.g., a vehicle battery jump starter).

The sensors 210 include, for example, one or more current sensors, one or more voltage sensors, one or more temperature sensors, etc. For example, the controller 200 uses the sensors 210 to monitor an individual state of charge of each of the battery cells 110, monitor a current being discharged from the battery cells 110, monitor the temperature of one or more of the battery cells 110, etc. If the voltage of one of the battery cells 110 is equal to or above an upper voltage limit (e.g., a maximum charging voltage), the charge/discharge control module 225 prevents the battery cells from being further charged or requests that a battery charger (not shown) provide a constant voltage charging scheme. Alternatively, if one of the battery cells 110 falls below a low-voltage limit, the charge/discharge control module prevents the battery cells 110 from being further discharged. Similarly, if an upper or lower operational temperature limit for the battery cells 110 is reached, the controller 200 can prevent the battery pack 100 from being charged or discharged until the temperature of the battery cells 110 or the battery pack 100 is within an acceptable temperature range.

Figure 5A:
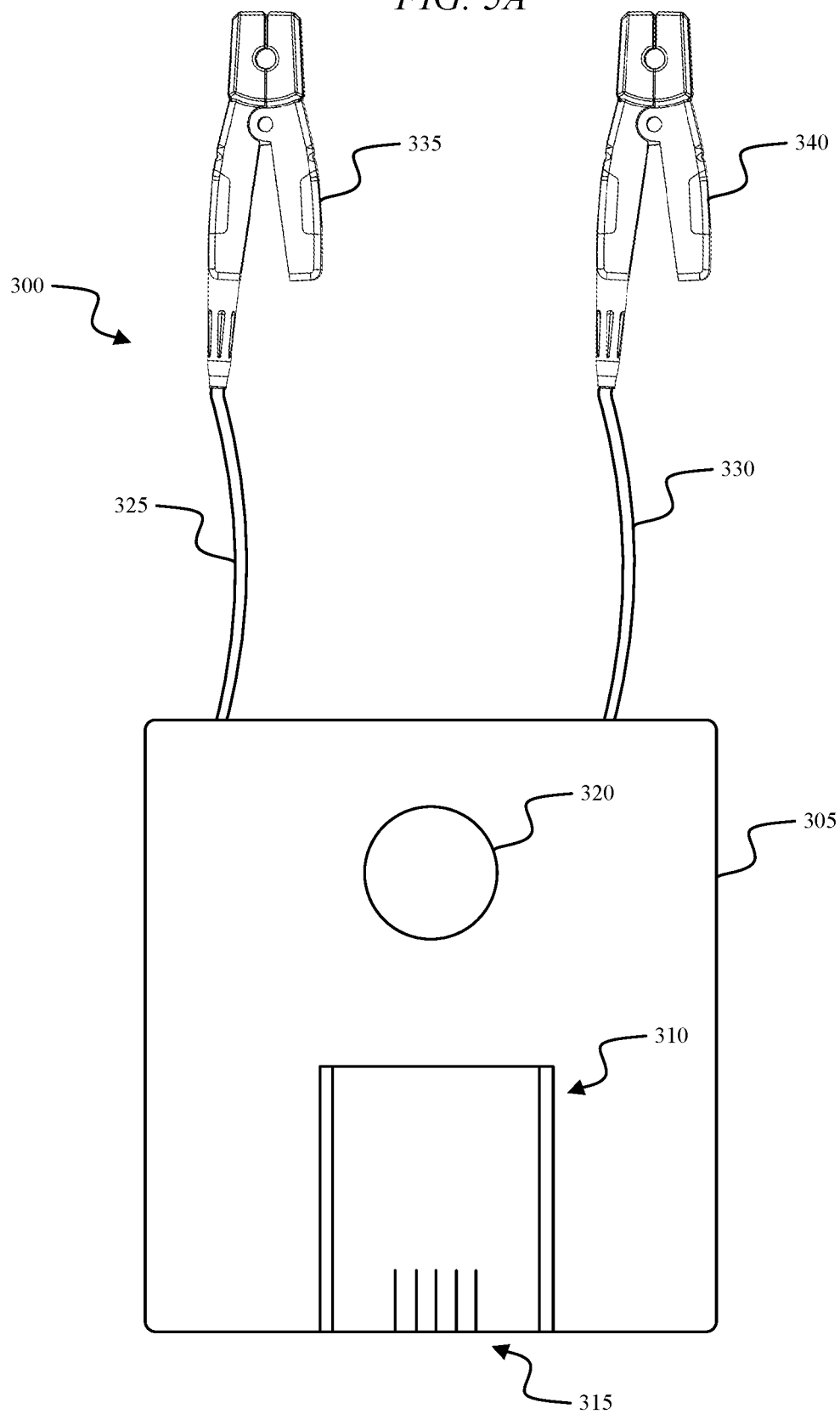
FIG. 5A illustrates a first embodiment of a vehicle battery jump starter configured to receive, support, and be powered by the battery pack of FIGS. 1-3.

The battery pack 100 is connectable to and supportable by a vehicle battery jump starter such as vehicle battery jump starter 300 illustrated in FIG. 5A. The vehicle battery jump starter 300 includes a housing 305, a support portion 310 for receiving and supporting the battery pack 100, a plurality of terminals 315 for electrically connecting the battery pack 100 to the vehicle battery jump starter 300, an ON or POWER button 320 for turning ON or activating the vehicle battery jump starter 300, a first electrical cable 325, a second electrical cable 330, a first terminal clamp 335, and a second terminal clamp 340. The battery pack 100 connects to the vehicle battery jump starter 300 through the support portion 310 and the plurality of terminals 315. As a result, the battery pack 100 operates as a power source for the vehicle battery jump starter 300. The support portion 310 is configured to receive and support battery packs 100 of various physical sizes. In addition, the plurality of terminals is configured to electrically connect battery packs 100 of various electrical characteristics, such as nominal voltage, to the vehicle battery jump starter 300.

Figure 5B:
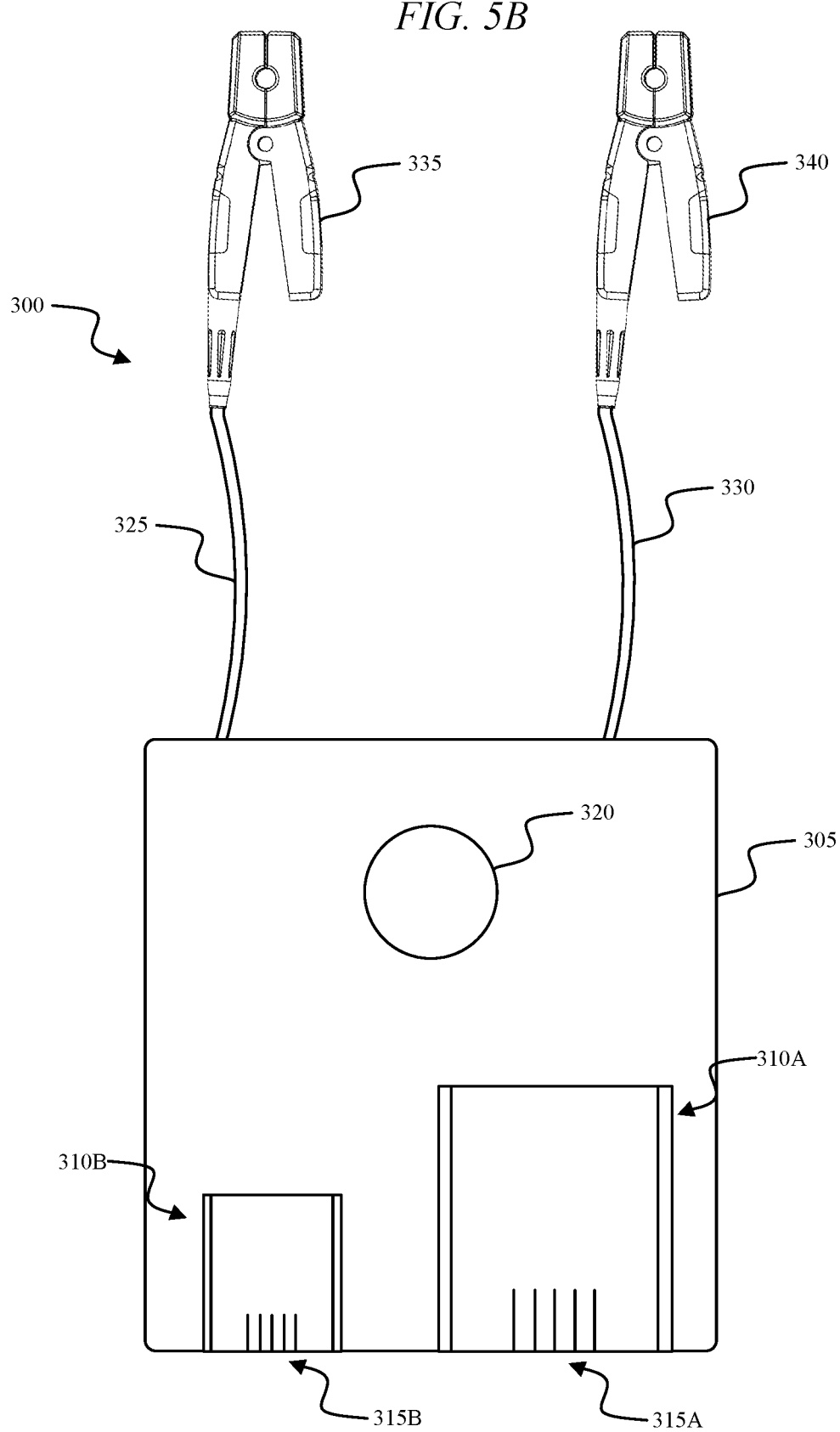
FIG. 5B illustrates a second embodiment of a vehicle battery jump starter configured to receive, support, and be powered by the battery pack of FIGS. 1-3.

In some embodiments, such as the embodiment illustrated in FIG. 5B, the vehicle battery jump starter 300 includes a first support portion 310A, a first plurality of terminals 315A, a second support portion 310B, and a second plurality of terminals 315B. The first support portion 310A is configured to receive and support battery packs 100 having a first physical size, such as the first battery pack 100A. The first plurality of terminals 315 is configured to electrically connect battery packs 100 of a first nominal voltage, such as the first battery pack 100A, to the vehicle battery jump starter 300. The second support portion 310B is configured to receive and support battery packs 100 having a second physical size, such as the second battery pack 100B. The second plurality of terminals 315B is configured to electrically connect battery packs 100 of a second nominal voltage, such as the second battery pack 100B, to the vehicle battery jump starter 300. The first physical size and the second physical size may be the same or different. Likewise, the first nominal voltage and the second nominal voltage may have the same voltage values or have different voltage values.

Figure 6:
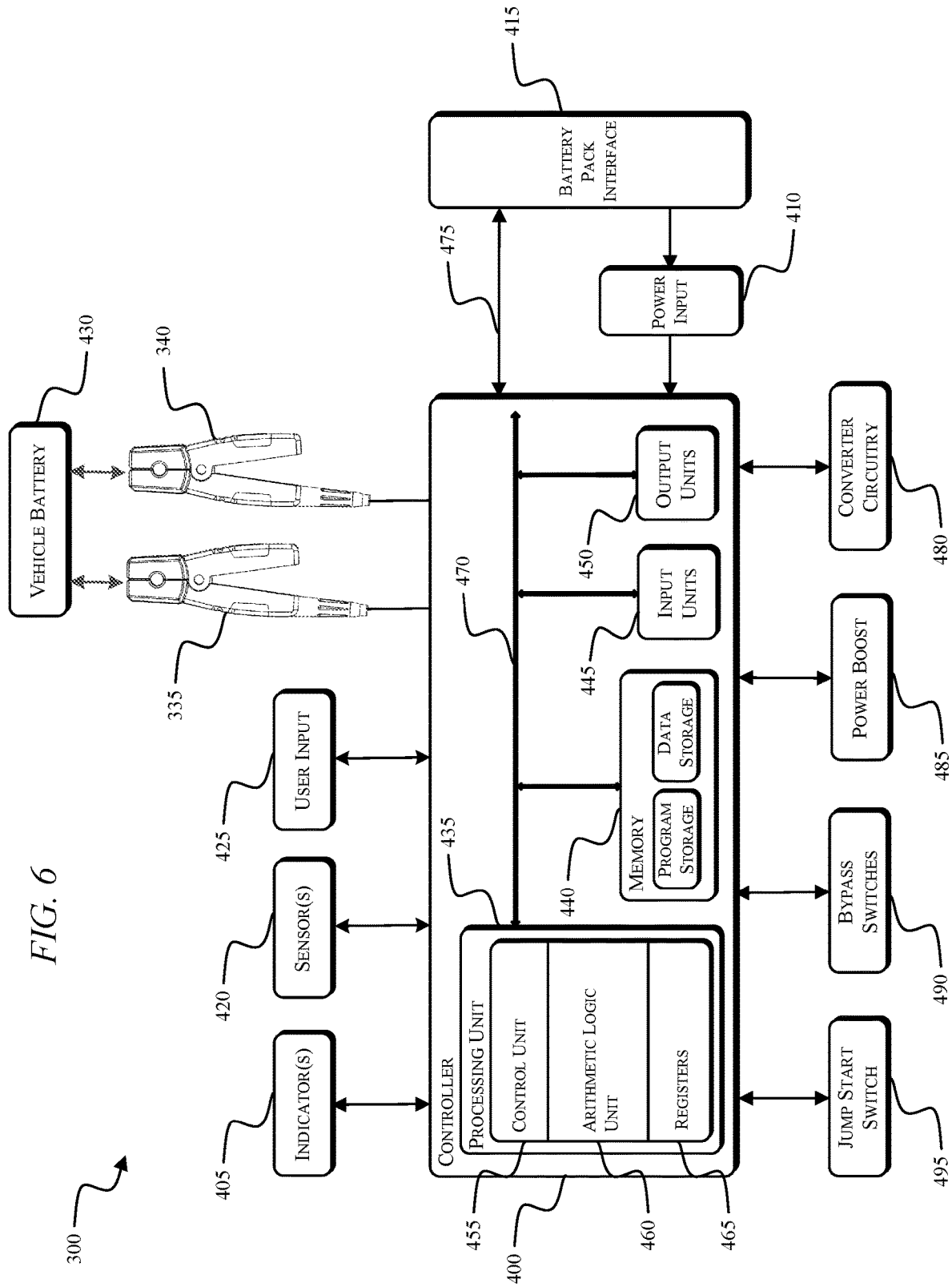
FIG. 6 is an electromechanical diagram of the vehicle battery jump starters of FIGS. 5A and 5B, according to embodiments described herein.

The vehicle battery jump starter 300 includes a controller 400, as shown in FIG. 6. The controller 400 is electrically and/or communicatively connected to a variety of modules or components of the vehicle battery jump starter 300. For example, the illustrated controller 400 is connected to, among other things, one or more indicators 405, a power input module 410, a battery pack interface 415, one or more sensors 420, a user input module 425, and a vehicle battery 430. The controller 400 includes combinations of hardware and software that are operable to, among other things, control the operation of the vehicle battery jump starter 300, monitor the operation of the vehicle battery jump starter 300, activate the one or more indicators 405 (e.g., an LED), etc. The one or more sensors 420 include, among other things, one or more voltage sensors, one or more current sensors, one or more temperature sensors, etc.

In some embodiments, the controller 400 includes a plurality of electrical and electronic components that provide power, operational control, and protection to the components and modules within the controller 400 and/or vehicle battery jump starter 300. For example, the controller 400 includes, among other things, a processing unit 435 (e.g., a microprocessor, a microcontroller, an electronic processor, an electronic controller, or another suitable programmable device), a memory 440, input units 445, and output units 450. The processing unit 435 includes, among other things, a control unit 455, an ALU 460, and a plurality of registers 465 (shown as a group of registers in FIG. 6), and is implemented using a known computer architecture (e.g., a modified Harvard architecture, a von Neumann architecture, etc.). The processing unit 435, the memory 440, the input units 445, and the output units 450, as well as the various modules connected to the controller 400 are connected by one or more control and/or data buses (e.g., common bus 470). The control and/or data buses are shown generally in FIG. 6 for illustrative purposes. The use of one or more control and/or data buses for the interconnection between and communication among the various modules and components would be known to a person skilled in the art in view of the embodiments described herein. In some embodiments, the controller 400 is implemented partially or entirely on a semiconductor (e.g., an FPGA semiconductor) chip.

The memory 440 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 435 is connected to the memory 440 and executes software instructions that are capable of being stored in a RAM of the memory 440 (e.g., during execution), a ROM of the memory 440 (e.g., on a generally permanent basis), or another non-transitory computer readable medium such as another memory or a disc. Software included in the implementation of the vehicle battery jump starter can be stored in the memory 440 of the controller 400. The software includes, for example, firmware, one or more applications, program data, filters, rules, one or more program modules, and other executable instructions. The controller 400 is configured to retrieve from memory and execute, among other things, instructions related to the control processes and methods described herein. In other constructions, the controller 400 includes additional, fewer, or different components.

The battery pack interface 415 includes a combination of mechanical components (e.g., the support portion 310) and electrical components (e.g., the plurality of terminals 315) configured to and operable for interfacing (e.g., mechanically, electrically, and communicatively connecting) the vehicle battery jump starter with the battery pack 100. As described above, in some embodiments, the vehicle battery jump starter 300 includes more than one battery interface 415. The battery pack interface 415 also includes, for example, a communication line 475 for providing a communication line or link between the controller 400 and the battery pack 100. The battery pack 100 may transmit operational characteristics, such as voltage, state of charge, remaining capacity etc., to the controller 400. In some embodiments, the battery pack interface 415 includes one or more sensors for measuring battery pack 100 voltage and current output.

Power provided by the battery pack 100 to the vehicle battery jump starter is provided through the battery pack interface 415 to a power input module 410. In some embodiments, the power input module 410 is configured to receive power from the vehicle battery 430 through terminal clamps 335 and 340. The power input module 410 includes combinations of active and passive components to regulate or control the power received from the battery pack 100 prior to power being provided to the controller 400. For example, the power input module 410 includes converter circuitry for 480 (illustrated separately for descriptive purposes). The converter circuitry 480 is used to convert power received from battery pack 100, or alternatively the vehicle battery 430, to appropriate levels for charging power boost module 485 (illustrated separately for descriptive purposes). In addition, power input module 410 includes one or more bypass switches 490 (illustrated separately for descriptive purposes) that selectively enable power to bypass the converter circuitry 480 and flow from the battery pack 100 to the vehicle battery 430 through a jump start switch 495 (illustrated separately for descriptive purposes).

Figure 7A:
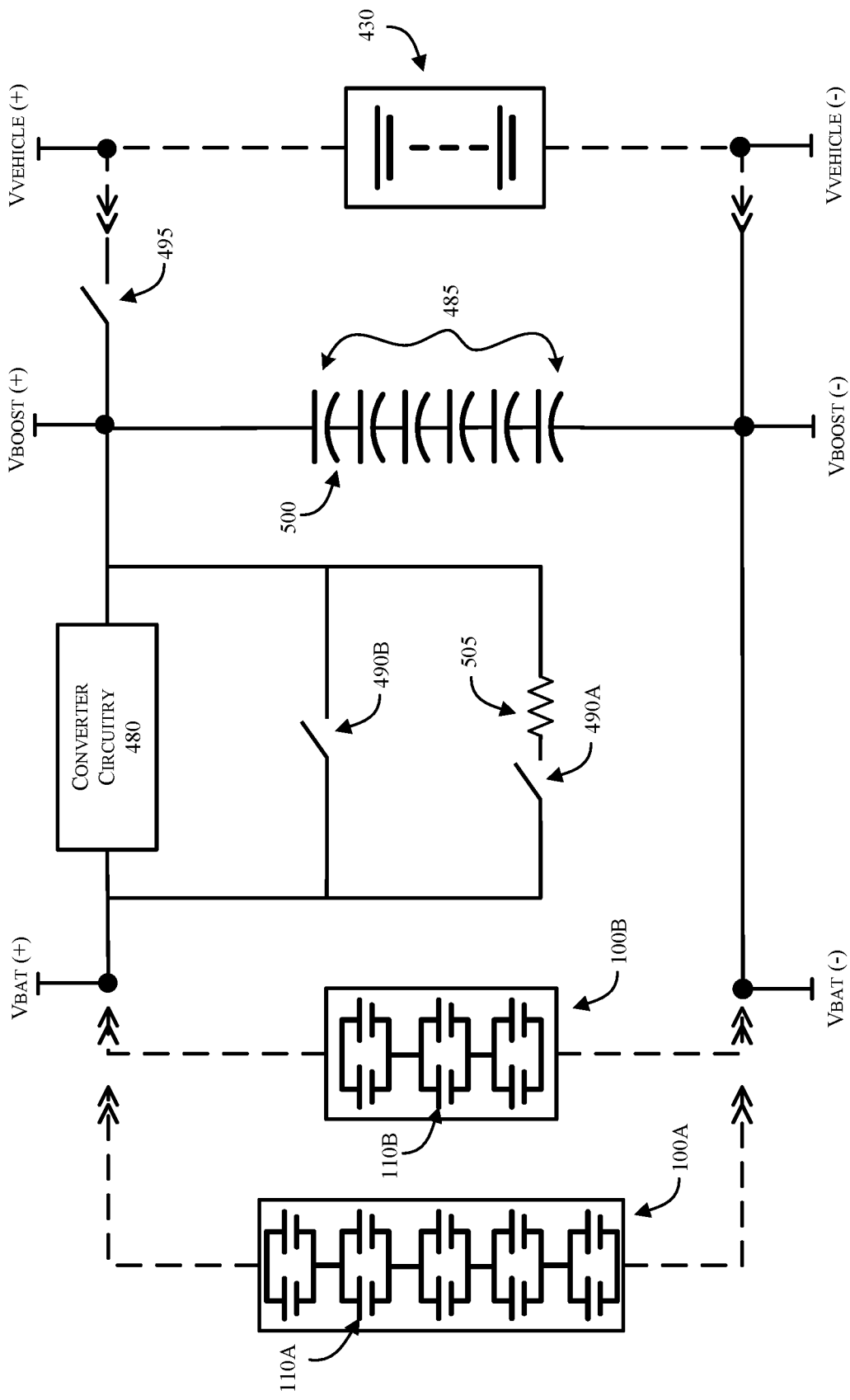
FIG. 7A is an electrical schematic diagram of the vehicle battery jump starter of FIG. 5A or FIG. 5B being powered by the battery pack of FIGS. 1-3, according to embodiments described herein.
Figure 7B:
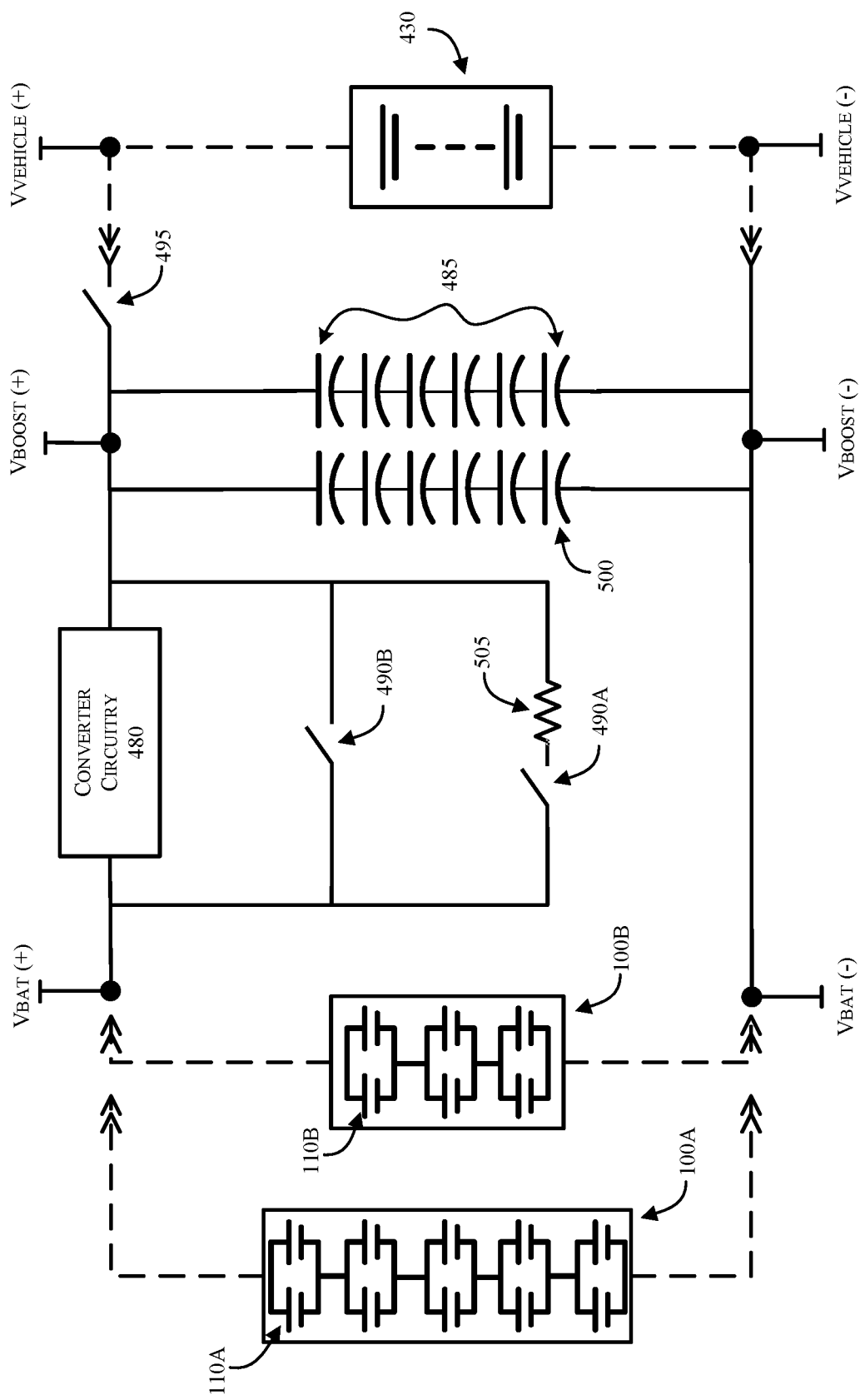
FIG. 7B is an electrical schematic diagram of the vehicle battery jump starter of FIG. 5A or FIG. 5B being powered by the battery pack of FIGS. 1-3, according to embodiments described herein.

The power boost module 485 includes a plurality of supercapacitor cells 500 (see FIGS. 7A and 7B). In some embodiments, the power boost module 485 includes lithium-polymer battery cells in addition to or in place of the supercapacitors 500. The supercapacitor cells 500 are constructed of materials with high specific power ratings, such as carbon materials (e.g., carbon nanotubes or graphene), carbon composites, metal oxides (e.g., nickel oxide, ruthenium oxide, etc.), etc. For example, supercapacitor cells 500 within the power boost module 485 have specific power ratings, such as, for example, between 1 kW/kg and 100 kW/kg. The supercapacitor cells 500 each have a specific energy rating of, for example, between 1 Wh/kg and 10 Wh/kg. In addition, a single supercapacitor cell 500 included in the power boost module 485 has a capacitance of, for example, between 20 Farads and 3600 Farads. Likewise, each supercapacitor has a nominal voltage of, for example, between 2V and 5V.

In some embodiments, the above described characteristics of the supercapacitor cells 500 are selected in accordance with the type of battery pack 100 that will be used with the vehicle battery jump starter 300. For example, if the power boost module 485 is paired with a battery pack 100 that has a nominal voltage of 12V (e.g., the second battery pack 100B), the total capacitance of the power boost module 485 used to jump start the vehicle electrical system is between 20 Farads and 400 Farads. Accordingly, each supercapacitor cell 500 included in the power boost module 485 of the above example has an individual capacitance of, for example, between 140 Farads and 2200 Farads. As another example, if the power boost module 485 is paired with a battery pack 100 that has a nominal voltage of 18V (e.g., the first battery pack 100A), the total capacitance of the power boost module 485 used to jump start the vehicle electrical system is between 5 Farads and 150 Farads. Accordingly, each supercapacitor cell 500 included power boost module 485 of the above example has an individual capacitance of, for example, between 50 Farads and 1500 Farads.

The power boost module 485 may include different numbers of supercapacitor cells 500 connected in a series, parallel, or a series-parallel combination. For example, FIG. 7A illustrates an embodiment of a power boost module 485 that includes a stack of six supercapacitor cells 500 connected in series. If it is assumed that each supercapacitor cell 500 has a nominal voltage of 2.67V and capacitance of 500 Farads, the power boost module 485 of the above example has a voltage of 16V and capacitance of 83 Farads. In another example, FIG. 7B illustrates an embodiment of a power boost module 485 that includes two parallel stacks of six series-connected supercapacitor cells 500. If it is assumed that each supercapacitor cell 500 has a nominal voltage of 2.67V and capacitance of 500 Farads, the power boost module 485 of the above example has a voltage of 16V and capacitance of 166 Farads. Persons skilled in the art will appreciate that the supercapacitor cells 500 included in power boost module 485 are not limited to the above described arrangements. Rather, the power boost module 485 may include any desired number of supercapacitor cells 500 connected in a series, parallel, or a series-parallel combination.

The power boost module 485 can be used in conjunction with the battery pack 100 to provide power for jump starting the vehicle battery 430. In some embodiments, the power boost module 485 alone (i.e., without battery pack 100) can be used to attempt to jump start a vehicle battery 430. Without the battery pack 100, however, the capabilities of the vehicle battery jump starter 300 are limited. For example, supercapacitor cells 500 alone may not have the energy capacity to jump start a vehicle without the assistance of a battery pack 100. Alternatively, lithium polymer battery cells require charging which may be difficult or impossible depending upon the location of the vehicle when its battery needs to be jump started.

FIGS. 7A and 7B are electrical schematic diagrams of the combination of a battery pack 100 and the vehicle battery jump starter 300 according to some embodiments. The vehicle battery jump starter 300 is connected to the vehicle battery 430. By connecting the battery pack 100 in parallel with the power boost module 485 and the vehicle battery 430, the vehicle battery jump starter 300 prevents the system voltage from exceeding 18V and potentially damaging the vehicle battery 430 or control electronics. Vehicle electrical systems typically operate at voltages ranging from a few volts (e.g., during starting) to approximately 14V (e.g., during charging). Conventional jump starters typically operate at voltages of between 10V and 14V. Higher voltage lithium-based battery packs, such as the first battery pack 100A (e.g., 18V battery packs) may be problematic as jump starters due to the high internal resistance of their battery cells (e.g., compared to lithium polymer cells and supercapacitors). Increasing the number of series connected battery cells increases the internal resistance of a battery pack. Connecting battery cells in parallel reduces internal resistance. However, for a 12V battery pack, such as the second battery pack 100B, a significant number of battery cells may need to be connected in parallel to reduce internal resistance enough to be able to jump start a vehicle battery. Counterintuitively, using an 18V lithium-based battery pack can make the battery pack appear electrically to be a 12V battery pack with reduced internal resistance. This effect can be shown numerically by applying Thevenin's theorem to calculate the 18V battery pack's Thevenin-equivalent resistance and Thevenin-equivalent voltage. As a result, a battery pack having a voltage higher than the vehicle electrical system's voltage can be used, such as the first battery pack 100A (e.g., an 18V lithium-based battery pack).

As described above, the vehicle battery jump starter 300 is operable to electrically connect to battery packs 100 of various different voltages and/or physical sizes. For example, as shown in FIGS. 7A and 7B, the vehicle battery jump starter 300 is configured to electrically connect to the first battery pack 100A and the second battery pack 100B. In the illustrated embodiment, the first battery pack 100A has nominal voltage of 18V and includes ten battery cells 110A configured in a series-parallel arrangement of five sets of two series-connected cells. The second battery pack 100B has a nominal voltage of 12V and includes six battery cells 110B configured in a series-parallel arrangement of three sets of two series-connected cells. Although FIGS. 7A and 7B only illustrate two different battery packs 100 as being electrically connectable to the vehicle jump starter 300, persons skilled in the art will appreciate that the vehicle jump starter 300 is operable to electrically connect to more than two different types of battery pack 100. The vehicle jump starter 300 is configured to electrically connect to any battery packs 100 that have a nominal voltage between, for example, 10.8V and 80V (e.g., 10.8V, 12V, 14.4V, 21V, 24V, 28V, 36V, 60V, 80V). The vehicle battery jump starter 300 is configured to receive one battery pack 100 at a time. However, in some embodiments, such as the vehicle battery jump starter 300 illustrated in FIG. 5B, the vehicle battery jump starter 300 is configured to receive more than one battery pack 100 at a time.

The vehicle battery jump starter 300 includes converter circuitry 480 that is configured to convert power received from a battery pack 100 and/or the vehicle battery 430 to appropriate level for charging the power boost module 485. The controller 400 selectively controls the converter circuitry 480 to prevent the battery pack 100 from providing excessive and/or insufficient discharge currents the power boost module 485. For example, charging of the power boost module 485 is controlled using a PWM signal from the controller 400 to limit the current from the battery pack 100 being used to charge the power boost module 485. As an example, it will be assumed that the power boost module 485 has a nominal voltage of 16V, and the first battery pack 100A, which has a voltage of 18V, is connected to battery pack interface 415. In such an example, the converter circuitry 480 is used to step down the power provided by first battery pack 100A for charging the power boost module 485 at 16V. In another example, it will be assumed that the power boost module 485 has a nominal voltage of 16V, and the second battery pack 100B, which has a voltage of 12V, is electrically connected to the battery pack interface 415. In such an example, the converter circuitry 480 is used to step up the power provided by the second battery pack 100B for charging the power boost module 485 at 16V. In some embodiments, the power boost module 485 is charged by vehicle battery 430 (e.g., supercapacitors can be charged from a depleted vehicle battery).

The vehicle jump starter 300 further includes one or more bypass switches 490, wherein each of the one or more bypass switches 490 are provided on separate current paths from the battery pack 100 to the vehicle battery 430. The bypass switches 490 are controlled by controller 400 to selectively enable power flowing from the battery pack 100 connected to the vehicle jump starter 300 to bypass the converter circuitry 480. In particular, during a jump start event, the controller 400 selectively closes one of the one or more bypass switches 490 to enable current to flow directly from the battery pack 100 to the vehicle battery 430 through jump start switch 495.

The controller 400 is configured to determine which of the one or more bypass switches 490 to activate based on the voltage of the battery pack 100 that is connected to the vehicle jump starter 300. The respective current paths on which the one or more bypass switches 490 are provided differ in path resistance, as a resistor can be placed on a current path to the vehicle battery 430 to limit the current discharge from the battery pack 100. In some embodiments, the controller 400 compares the voltage of battery pack 100 to a configurable bypass voltage threshold (e.g., 16V). If the controller 400 determines that the voltage of battery pack 100 is less than the configurable bypass voltage threshold during a jump start event, the controller 400 turns on the bypass switch provided on the current path of least resistance. Alternatively, if the controller 400 determines that the voltage of battery pack 100 is greater than the configurable bypass voltage threshold during a jump start event, the controller 400 turns on the bypass switch 490 provided on the current path of most resistance. In some embodiments, the controller 400 is further configured to compare the voltage of battery pack 100 to a low voltage threshold (e.g., 6V). If the voltage of battery pack 100 is less than the low voltage threshold, the controller 400 does not activate any of the bypass switches 490 to prevent damaging the battery pack 100. In some embodiments, the low voltage threshold is unique to the battery pack 100 that is connected to the vehicle battery jump starter 300. For example, a battery pack 100 that has a nominal voltage of 18V may have an associated low voltage threshold that is greater than the low voltage threshold associated with a battery pack 100 that has a nominal voltage of 12V.

In some embodiments, the vehicle jump starter 300 includes a single bypass switch 490 that is selectively closed during a jump start event. In other embodiments, the vehicle jump starter 300 includes three or more bypass switches 490 that are provided on respective current paths from the battery pack to the vehicle battery. In such embodiments, the controller 400 is configured to activate the bypass switch that corresponds to the voltage range in which the voltage of battery pack 100 lies.

As an example, in the illustrated embodiment of FIGS. 7A and 7B, the vehicle jump starter 300 includes a first bypass switch 490A and a second bypass switch 490B. The current path on which bypass switch 490A is provided includes a resistor 505. However, the current path on which bypass switch 490B is provided does not include a resistor. Thus, the first bypass switch 490A is provided on a current path that has a greater resistance than the current path on which bypass switch 490B is provided. Accordingly, if the first battery pack 100A is connected to the vehicle jump starter 300 and has a voltage that is greater than the configurable bypass voltage threshold (e.g., 16V), the controller 400 closes bypass switch 490A during a jump start event. Likewise, if the second battery pack 100B is connected to the vehicle jump starter 300 and has a voltage that is less than the configurable bypass voltage threshold, the controller 400 will close bypass switch 490B during a jump start event. However, if battery pack 100 that is connected to vehicle jump starter 300 has a voltage level that is below the low voltage threshold, the controller 400 will not activate either of the bypass switches 490.

In some embodiments, the controller 400 is configured to monitor the voltage of the battery pack 100 while a jump start event is occurring. For example, the controller 400 is configured to monitor the voltage of battery pack 100 while current flows from the battery pack 100 to the vehicle battery 430. If the voltage of battery pack 100 traverses the configurable bypass voltage threshold while the jump start event is occurring, the controller 400 is configured to alter the current path from the battery pack 100 to the vehicle battery 430. The controller 400 can alter the current path from battery pack 100 to the vehicle battery 430 by opening the bypass switch 490 that is closed and closing the bypass switch that is open. For example, if the first battery pack 100A is connected to the vehicle jump starter 300 and has a voltage that is greater than the configurable bypass voltage threshold (e.g., 16V), the controller 400 closes first bypass switch 490A to enable current to flow from the first battery pack 100A to the vehicle battery 430. However, if the voltage of the first battery pack 100A drops below the configurable bypass voltage threshold while the jump start event is occurring, the controller 400 is configured to open the first bypass switch 490A and close the second bypass switch 490B. Accordingly, closing the second bypass switch 490B allows for current to flow along a less resistive path from the first battery pack 100A to the vehicle battery 430.

The jump switch 495 is controlled by controller 400 to electrically connect the vehicle jump starter 300 to the vehicle battery 430 when a jump start event is ready and an attempt to start the vehicle is made. The controller 400 determines whether a jump start event is ready based one or more criteria being fulfilled. For example, the controller 400 is configured to perform a polarity check to determine whether the terminal clamps 335 and 340 are properly connected to the vehicle battery 430. For example, if the controller 400 determines that terminal clamps 335 and 340 are not properly connected to the vehicle battery 430, the controller 400 determines that a jump start event is not ready. The controller 400 is further configured to determine whether the vehicle battery 430 is within an acceptable voltage range. For example, if the controller 400 determines that the vehicle battery 430 is fully charged or has a voltage level that is below a minimum jump start vehicle threshold, the controller 400 will determine that a jump start event is not ready. In addition, the controller 400 is configured to determine whether the power boost module 485 and the battery pack 100 are within acceptable voltage ranges. For example, if the voltage level of the power boost module 485 is not above a jump start boost threshold, the controller 400 will determine that a jump start event is not ready. Likewise, if the voltage level of the battery pack 100 is below a jump start battery threshold, the controller 400 will determine that a jump event is not ready.

In some embodiments, the controller 400 is additionally configured to monitor user input module 425 to determine whether a jump start event is ready. For example, the controller 400 may monitor the user input module 425 for a user command to initiate a jump start event. The user command may be implemented as, but not limited to, the press of a button that is located on the housing 305 of the vehicle jump starter 300, the press of a button that is located on a remote control device associated with the vehicle battery jump starter 300 (e.g., a smartphone, a wireless fob, a etc.), a voice command, etc. Upon receipt of any of the above mentioned user commands, the controller 400 determines a jump start event is ready. In some embodiments, the controller 400 does not monitor the user input module 425 to determine whether a jump event is ready. In some embodiments, the controller 400 may be configured to automatically close jump start switch 495 when a vehicle start attempt is detected. In some embodiments, the controller 400 is configured to automatically close jump start switch 495 once a configurable amount of time (e.g., 5 seconds) passes after the controller 400 determines that the battery pack 100, vehicle battery 430, and the power boost module 485 are within desired voltage ranges.

In some embodiments, the vehicle battery jump starter 300 also includes a current sensor (e.g., a shunt resistor) so the controller 400 can monitor the current being discharged to the vehicle battery 430, as well as positive and negative voltage taps that allow the controller 400 to monitor the voltage of the vehicle battery 430, the power boost module 485, and the battery pack 100. The controller 400 can monitor discharge current during an attempted jump start to ensure that the current being discharged does not exceed a high current threshold value or a particular value for an extended period of time. For example, the battery pack 100 in combination with the power boost module 485 output a combined current of approximately 750 A for approximately 50 milliseconds to jump start the vehicle battery 430, and a combined current of 200 A or more for several seconds thereafter. In order to protect the battery pack 100 and the vehicle battery jump starter 300, the controller 400 can prevent the vehicle battery jump starter 300 from discharging current in excess of 500 A for more than 100 milliseconds or greater than 200 A for five seconds. These limits can vary based on the battery pack being used to power the vehicle battery jump starter 300. However, in each instance, discharge current limits are in place to prevent damage to the battery pack 100, the vehicle battery jump starter 300, or the vehicle battery 430.

In addition to the discharge current limitations of the battery pack 100, the battery pack 100 also has voltage and temperature limitations within which it must operate. Each of the discharge current, voltage, and temperature limitations of the battery pack 100 can be monitored and controlled by the controller 200 of the battery pack. The power boost module 485 also has discharge current, voltage, and temperature limitations independent from those of the battery pack 100 within which it must operate. Each of the discharge current, voltage, and temperature limitations of the power boost module 485 can be monitored and controlled by the controller 400 of the vehicle battery jump starter 300. In some embodiments, each of the battery cells 110 and the power boost module 485 (e.g., supercapacitor cells 500, lithium polymer battery cells, or a combination of supercapacitor cells and lithium polymer battery cells) can be independently disconnected in the event of a current, voltage, or temperature limit being reached (i.e., a fault condition).

Figure 8:
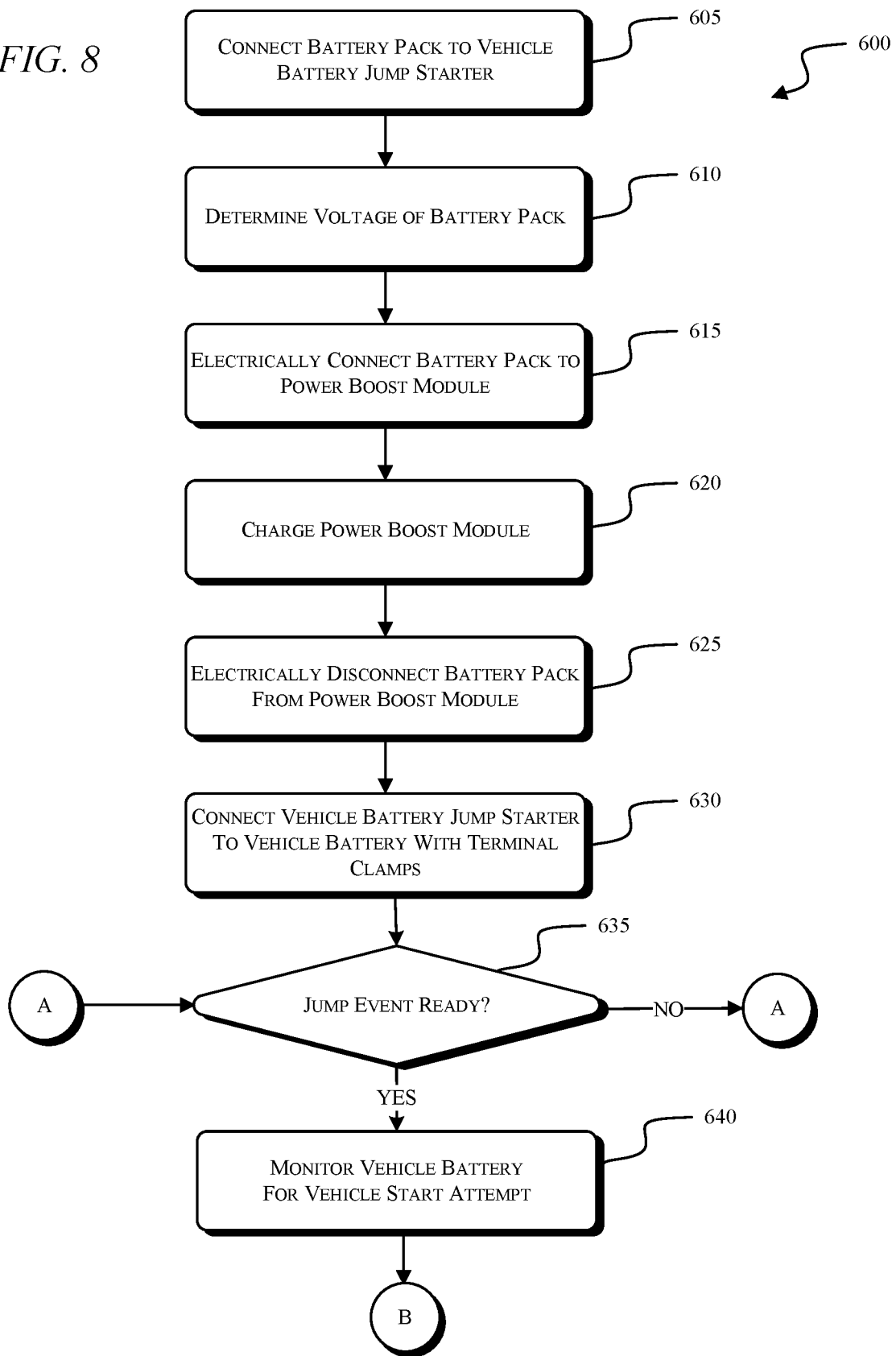
FIGS. 8 and 9 are a process for jump starting a vehicle battery using the vehicle battery jump starter of FIG. 5A or FIG. 5B being powered by the battery pack of FIGS. 1-3, according to embodiments described herein.
Figure 9:
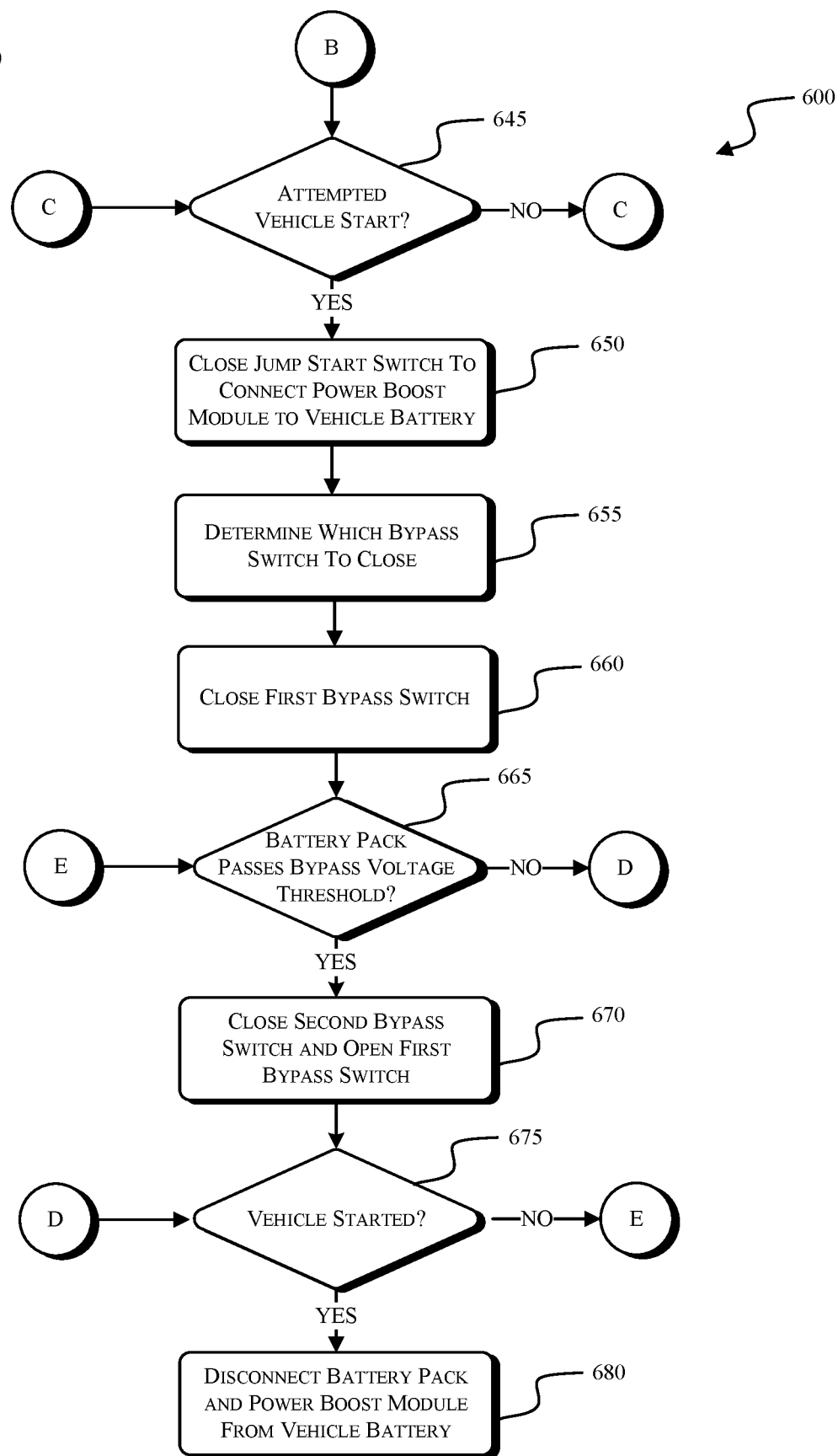

The operation of the combination of a battery pack 100 and vehicle battery jump starter 300 is described with respect to a process 600 in FIGS. 8-9. The process 600 begins with the battery pack 100 being attached to the vehicle battery jump starter 300 (STEP 605). Following STEP 605, the controller 400 determines the voltage level of the battery pack 100 that is attached to the vehicle battery jump starter 300 (STEP 610). As described above, the vehicle battery jump starter 300 is operable to receive battery packs 100 of various voltage levels, and operation of the vehicle battery jump starter 300 may vary based on the voltage level of the battery pack 100 that is attached. Therefore, determining the voltage of the attached battery pack 100 enables the controller 400 to appropriately control operation of the vehicle jump starter 300.

The controller 400 of the vehicle battery jump starter 300 controls the converter circuitry 480 to electrically connect the battery pack 100 to the power boost module 485 for charging (STEP 615). After the battery pack 100 is connected to the power boost module 485, stored energy from the battery pack 100 can be used to charge the power boost module 485 (STEP 620). If the voltage level of the battery pack 100 is greater than the charging voltage of power boost module 485 (e.g., 16V), the converter circuitry 480 steps down the voltage provided by battery pack 100 during charging. For example, if battery pack 100A is connected to the vehicle battery jump starter 300, the converter circuitry 480 steps down the voltage from 18V to 16V during charging of the power boost module 485. If the voltage level of the battery pack 100 is less than the charging voltage of power boost module 485 (e.g., 12V), the converter circuitry 480 steps up the voltage provided by battery pack 100 during charging. For example, if battery pack 100B is connected to the vehicle battery jump starter 300, the converter circuitry 480 steps up the voltage from 12V to 16V during charging of the power boost module 485.

In some embodiments, the controller 400 is configured to perform balanced charging of the supercapacitor cells 500 and/or lithium polymer battery cells included in power boost module 485. For example, the controller 400 is configured to monitor the voltage level of individual supercapacitor cells 500 included in the power boost module 485 during charging. The controller 400 determines whether a difference between the voltage levels of any of the supercapacitor cells 500 exceeds a balance threshold. If the difference between any supercapacitor cell 500 voltage levels equals or exceeds the balance threshold, the controller 400 is configured to pause the charging of supercapacitor cells 500 that have a high voltage level. While charging of the high voltage supercapacitor cells 500 is paused, the low voltage supercapacitor cells 500 continue to be charged to reduce the imbalance between supercapacitor cell 500 voltage levels of supercapacitor cells 500. In some embodiments, the controller 400 is configured to selectively discharge high voltage supercapacitor cells 500 through resistors that are respectively connected in parallel with the high voltage supercapacitor cells 500. Accordingly, energy dissipated from the high voltage supercapacitor cells 500 through the respective resistors results in a reduced imbalance between the voltage levels of supercapacitor cells 500. Selective charging or discharging of the supercapacitor cells 500 can be achieved using parallel-connected combinations of switches (e.g., FETs) and resistors across each supercapacitor cell 500.

After the power boost module 485 has been fully charged, the controller 400 controls the converter circuitry 480 to electrically disconnect the battery pack 100 from the power boost module 485 (STEP 625). With the power boost module 485 charged and the battery pack 100 connected to the vehicle battery jump starter 300, the combination of the battery pack 100 and the vehicle battery jump starter 300 can be used to jump start the vehicle battery 430.

At STEP 630, the vehicle battery jump starter 300 is connected to the vehicle battery 430 via terminal clamps 335 and 340 (STEP 630). Persons skilled in the art will appreciate the terminal clamps 335 and 340 may be attached to the vehicle battery jump starter before STEP 630, and thus, is not limited to the order of steps illustrated in FIGS. 8 and 9. Once the vehicle battery jump starter 300 is connected to the vehicle battery 430, the controller 400 determines whether a jump start event is ready (STEP 635). As described above, the controller 400 determines that a jump start event is ready when specific criteria are satisfied. In some embodiments, the controller 400 determines that a jump start event is ready if the terminal clamps 335 and 340 are properly connected to the vehicle battery 430 (e.g., connected with the correct polarity). In some embodiments, the controller 400 determines that a jump start event is ready if the voltage of battery pack 100 is within a desired range, the voltage of vehicle battery 430 is within a desired ranged, and/or the voltage of power boost module 485 is within a desired range. In some embodiments, the controller 400 determines that a jump start event is ready in response to receiving a command from user input module 425. In some embodiments, the controller 400 determines that a jump start event is ready when a combination of one or more of the above described criteria are satisfied.

If a jump start event is not ready, the controller 400 of the vehicle battery jump starter 300 or the controller 200 of the battery pack 100 can selectively prevent the battery pack 100 from being used to jump start the vehicle battery 430. For example, if the voltage of the battery pack 100 is so low that attempting to jump start the vehicle battery 430 could damage the battery pack 100, either controller 400 and/or controller 200 will determine that a jump start event is not ready and operation of the battery pack 100 is prevented. In addition to a standard low-voltage cutoff for the battery cells 110 of the battery pack 100, a second low-voltage threshold value can be implemented to prevent the battery pack 100 from being used to jump start a vehicle. The battery pack 100 can determine that it is connected to the vehicle battery jump starter 300 (e.g., rather than a hand held power tool) via communication with the vehicle battery jump starter 300 or an identification device (e.g., a resistor). The controller 200 of the battery pack 100 can then prevent the battery pack 100 from discharging current when the battery pack 100's voltage is below the second threshold value and discharging current would drop the voltage of the battery pack 100 below the standard low-voltage cutoff (e.g., 2.6V per cell). The second voltage threshold value is selected to correspond to the amount of energy required to jump start the vehicle battery 430 or an expected voltage reduction resulting from the discharge of the high current necessary to jump start a vehicle battery. If the battery pack 100 has less charge than would be required to jump start the vehicle battery 430, and attempting to jump start the vehicle battery 430 would cause the battery pack 100's voltage to be depleted below or fall below the standard low-voltage cutoff, the controller 200 determines that a jump start event is not ready and prevents the battery pack 100 from attempting to jump start the vehicle battery 430. When either controller 400 and/or controller 200 determine that a jump start event is not ready, the process 600 remains at STEP 635 until the battery pack 100 and/or vehicle battery 430 is disconnected from the vehicle battery jump starter 300 or a timeout condition occurs.

When a jump start event is determined to be ready, the controller 400 monitors the voltage across the vehicle battery 430 for an attempted vehicle start (STEP 640). When an attempt to start a vehicle is made, the voltage of the vehicle battery 430 is reduced. This reduction in voltage of the vehicle battery 430 signals to the controller 400 that an attempt to start the vehicle has been made. The process 600 then proceeds to control section B shown in and described with respect to FIG. 9.

With reference to FIG. 9, if an attempt to start a vehicle has not been made at STEP 645, the process 600 waits at STEP 645 for a vehicle start attempt to be made (or for a timeout condition of the controller 400 to occur). After a vehicle start attempt is detected by the controller 400 at STEP 645, the controller 400 closes jump start switch 495 to electrically connect the power boost module 485 to the vehicle battery 430, causing power boost module 485 to discharge current to the vehicle battery 300 (STEP 650). At STEP 655, the controller 400 determines which bypass switch to close for electrically connecting battery pack 100 to the vehicle battery 430 (STEP 655). As described above, the controller 400 selects which bypass switch 490 to close based on the voltage of the battery pack 100 that is connected to vehicle battery jump starter 300. If the voltage of battery pack 100 is greater than a bypass voltage threshold (e.g., 16V), the controller 400 determines to close the bypass switch 490 that is provided on the most resistive current path from the battery pack 100 to the vehicle battery 430. With reference to FIGS. 7A and 7B, the controller 400 determines to close bypass switch 490A when the voltage of battery pack 100 is greater than bypass voltage threshold. Likewise, if the voltage of battery pack 100 is less than a bypass threshold voltage, the controller 400 determines to close the bypass switch 490 that is provided on the least resistive current path from the battery pack 100 to the vehicle battery 430. With reference to FIGS. 7A and 7B, the controller 400 determines to close bypass switch 490B when the voltage of battery pack 100 is less than the bypass voltage threshold. STEP 655 may not be necessary in embodiments of the vehicle battery jump starter that include only one bypass switch.

After the determination at STEP 655 is made, the controller 400 closes the appropriate bypass switch 490 (STEP 660). Accordingly, at STEP 660, current flows from the power boost module 485 and the battery pack 100 are to the vehicle battery 430 through jump start switch 495. In some embodiments, the controller 400 waits a configurable amount of time (e.g., 20 ms) before closing the bypass switch 490. In some embodiments, the controller 400 delays the closure of bypass switch 490 until the voltage of power boost module 485, vehicle battery 430, and/or battery pack 100 drops by a configurable amount. In some embodiments, the controller 400 closes bypass switch 490 immediately after or concurrently with closing jump start switch 495.

As the jump start current is being provided from the battery pack 100 and power boost module 485 to the vehicle battery 430, the controller 400 monitors the voltage of the battery pack 100 (STEP 665). If the voltage of the battery pack 100 crosses the bypass voltage threshold, the controller 400 closes a second bypass switch (e.g., bypass switch 490B) and opens the previously closed bypass switch (e.g., bypass switch 490A) (STEP 670). If the voltage of the battery pack 100 does not cross the bypass voltage threshold, the controller monitors the voltage of the vehicle battery to determine if the vehicle has started (STEP 675).

When the controller 400 determines that the vehicle has not yet been started at STEP 675, the process 600 returns to at STEP 665 and STEPS 665-675 are cycled until the vehicle starts (or a timeout condition of the controller 400 or low-voltage condition of the battery pack 100 occurs). When, at STEP 675, the controller 400 detects that the vehicle has started, the controller 400 electrically disconnects the battery pack 100 and the power boost module 485 from the vehicle battery 430. The vehicle battery jump starter 300 and terminal clamps 335, 340 can then be physically disconnected (STEP 680).

In some embodiments, the controller 400 opens the jump start switch 495 to prevent discharge from the vehicle battery jump starter 300 when there is a low resistance between VOLTAGE (+) and VOLTAGE (−) terminals of the vehicle battery jump starter 300. Such a low resistance can be caused by shorted jumper cables or a shorted vehicle battery 430. The controller 400 can detect such a condition and open the jump start switch 495 to prevent discharge and, as a result, prevent sparking.

In some embodiments, the jump start switch 495 is used as an override switch to connect the battery pack 100 and power boost module 485 to the vehicle battery 430 without attempting to jump start the vehicle battery 430. For example, diesel vehicles require glow plugs to be sufficiently warm to cause fuel ignition. A depleted vehicle battery may not be able to sufficiently warm the glow plugs alone. By connecting the battery pack 100 and power boost module 485 to the vehicle's battery through the jump start switch 495, power from the battery pack 100 and the power boost module 485 can be used to warm the glow plugs. Additionally, newer vehicles may electronically prevent an operator from trying to start a vehicle if the vehicle's battery is depleted (e.g., even if a jump starter is attached). Connecting the battery pack 100 and power boost module 485 to the vehicle's battery through the jump start switch 495 can raise the vehicle's system voltage enough to allow the operator to attempt to start the vehicle.

Thus, embodiments described herein provide, among other things, a vehicle battery jump starter operable to be powered by removable and rechargeable battery packs of various voltages. Various features and advantages are set forth in the following claims.

What is claimed is:

1. A vehicle battery jump starter comprising:
  a battery pack interface configured to receive a battery pack;
  a power boost module including one or more energy storage devices;
  first and second terminals configured to electrically connect the vehicle battery jump starter to a vehicle battery;
  a jump start switch electrically connected between the power boost module and one of the first and second terminals;
  a converter circuit electrically connected between the battery pack interface and the power boost module;
  a bypass switch provided on a current path from the battery pack interface to the vehicle battery; and
  a controller including an electronic processor configured to:
    charge, by the converter circuit, the one or more energy storage devices included in the power boost module with current from the battery pack attached to the battery pack interface,
    close the jump start switch to discharge current from the power boost module to the vehicle battery, and
    close the bypass switch to discharge current from the battery pack to the vehicle battery.

2. The vehicle battery jump starter of claim 1, wherein the bypass switch is electrically connected in parallel with the converter circuit.

3. The vehicle battery jump starter of claim 1, wherein the controller is further configured to close the bypass switch after closing the jump start switch.

4. The vehicle battery jump starter of claim 1, wherein the controller is further configured to close the bypass switch after at least one of a voltage of the battery pack decreases by a first amount or a voltage of the power boost module decreases by a second amount.

5. The vehicle battery jump starter of claim 1, wherein the controller is further configured to:
determine whether a vehicle start has been attempted based on a voltage of the vehicle battery; and
close the jump start switch to discharge current from the power boost module to the vehicle battery when the vehicle start has been attempted.

6. The vehicle battery jump starter of claim 1, wherein the controller further configured to:
determine whether a voltage of the battery pack is less than a voltage threshold; and
close the bypass switch when the voltage of the battery pack attached to the battery pack interface is less than the voltage threshold.

7. The vehicle battery jump starter of claim 6, further comprising:
a second bypass switch provided on a second current path from the battery pack interface to the vehicle battery; and
wherein the controller is further configured to close the second bypass switch when the voltage of the battery pack attached to the battery pack interface is greater than the voltage threshold.

8. A vehicle battery jump starter system comprising:
a rechargeable battery pack; and
a vehicle battery jump starter including:
a battery pack interface configured to receive the rechargeable battery pack,
a power boost module including one or more energy storage devices,
first and second terminal clamps configured to electrically connect the vehicle battery jump starter to a vehicle battery,
a jump start switch electrically connected between the power boost module and one of the first and second terminals,
a converter circuit electrically connected between the battery pack interface and the power boost module,
a bypass switch provided on a current path from the battery pack interface to the vehicle battery; and
a controller including an electronic processor configured to:
charge, by the converter circuit, the one or more energy storage devices included in the power boost module with current from the rechargeable battery pack,
close the jump start switch to discharge current from the power boost module to the vehicle battery, and
close the bypass switch to discharge current from the rechargeable battery pack to the vehicle battery.

9. The system of claim 8, wherein the bypass switch is electrically connected in parallel with the converter circuit.

10. The system of claim 8, wherein the controller is further configured to close the bypass switch after closing the jump start switch.

11. The system of claim 8, wherein the controller is further configured to close the bypass switch after at least one of a voltage of the rechargeable battery pack decreases by a first amount or a voltage of the power boost module decreases by a second amount.

12. The system of claim 8, wherein the controller is further configured to:
determine whether a vehicle start has been attempted based on a voltage of the vehicle battery; and
close the jump start switch to discharge current from the power boost module to the vehicle battery when the vehicle start has been attempted.

13. The system of claim 8, wherein the controller further configured to:
determine whether a voltage of the rechargeable battery pack is less than a voltage threshold; and
close the bypass switch when the voltage of the rechargeable battery pack is less than the voltage threshold.

14. The system of claim 13, further comprising a second bypass switch provided on a second current path from the battery pack interface to the vehicle battery; and
wherein the controller is further configured to close the second bypass switch when the voltage of the rechargeable battery pack is greater than the voltage threshold.

15. A method of jump starting a vehicle battery, the method comprising:
attaching a removable and rechargeable battery pack to a vehicle battery jump starter, the vehicle battery jump starter including a power boost module including one or more energy storage devices, a converter circuit, a jump start switch, a bypass switch, and a controller including an electronic processor;
electrically connecting the vehicle battery jump starter to the vehicle battery;
charging, by the converter circuit, the one or more energy storage devices included in the power boost module with current from the removable and rechargeable battery pack;
closing the jump start switch to discharge current from the power boost module to the vehicle battery; and
closing the bypass switch to discharge current from the removable and rechargeable battery pack to the vehicle battery.

16. The method of claim 15, wherein the bypass switch is electrically connected in parallel with the converter circuit.

17. The method of claim 15, further comprising closing the bypass switch after closing the jump start switch.

18. The method of claim 15, further comprising closing the bypass switch after at least one of a voltage of the removable and rechargeable battery pack decreases by a first amount or a voltage of the power boost module decreases by a second amount.

19. The method of claim 15, further comprising:
determining, by the controller, whether a vehicle start has been attempted based on a voltage of the vehicle battery; and
closing the jump start switch to discharge current from the power boost module to the vehicle battery when the vehicle start has been attempted.

20. The method of claim 15, further comprising:
determining, by the controller, whether a voltage of the removable and rechargeable battery pack is less than a voltage threshold; and
closing the bypass switch when the voltage of the removable and rechargeable battery pack is less than the voltage threshold.

* * * * *